United States Patent [19]
Fujita

[11] Patent Number: 5,930,816
[45] Date of Patent: Jul. 27, 1999

[54] MEMORY BACK-UP APPARATUS AND METHOD AND AUDIO AND/OR VIDEO DATA RECORDING AND REPRODUCING APPARATUS

[75] Inventor: Hiroyuki Fujita, Kanagawa, Japan

[73] Assignee: Sony Corporation, Tokyo, Japan

[21] Appl. No.: 08/873,278

[22] Filed: Jun. 11, 1997

[30] Foreign Application Priority Data

Jun. 11, 1996 [JP] Japan ................................. 8-148785

[51] Int. Cl.$^6$ .................................................. G06F 13/00
[52] U.S. Cl. ...................... 711/104; 395/182.04; 365/229; 711/162
[58] Field of Search .................... 711/104, 162, 711/122; 395/182.04; 365/229

[56] References Cited

U.S. PATENT DOCUMENTS

| | | | |
|---|---|---|---|
| 5,511,020 | 4/1996 | Hu et al. | 365/185.28 |
| 5,532,676 | 7/1996 | Moore, III | 365/229 X |
| 5,590,082 | 12/1996 | Abe | 365/229 X |
| 5,677,890 | 10/1997 | Liong et al. | 365/229 |
| 5,706,239 | 1/1998 | Brys | 365/226 |
| 5,784,548 | 7/1998 | Liong et al. | 395/182.04 |

*Primary Examiner*—David L. Robertson
*Attorney, Agent, or Firm*—Frommer Lawrence & Haug, LLP; William S. Frommer

[57] ABSTRACT

A memory back-up apparatus and method and an audio and/or video data recording and reproducing apparatus with which the loss of significant data is prevented where an abnormality occurs in the apparatus. The significant data to be backed up is copied to a SRAM from an external RAM. Where writing occurs in the significant data before completion of the copying, the copying is tried again from the first. Further, periodically, the data is copied from the SRAM to the other SRAM via the data. At the restart processing, the power supply status signal of a voltage detection device is inspected, and where the battery is consumed, the data backed up to a nonvolatile memory is copied to an original address of an external RAM, and where it is not consumed, the data stored in the SRAM is copied to the original address of the external RAM.

9 Claims, 7 Drawing Sheets

TC : INTERVAL TIME OF COPY
N : MEMORY SIZE

MEMORY BACK-UP APPARATUS AND METHOD AND AUDIO AND/OR VIDEO DATA RECORDING AND REPRODUCING APPARATUS

BACKGROUND OF THE INVENTION

Field of the Invention

The present invention relates to a memory back-up apparatus and method for the back-up of the data stored in a memory of a control computer etc. and an audio and/or video data recording and reproducing apparatus for the back-up of indispensable data in a recording region of data by this memory back-up apparatus.

In the past, use has been made of an audio and/or video data server (video server) which has a recording apparatus using a randomly accessible recording medium such as a hard disc (HD) or magneto-optical disc (MO disc), records audio data and video data or either of them (audio and/or video data) in the recording medium, and can provide any part of the audio and/or video data to a video processing apparatus such as a video signal editing apparatus.

In such a video server, a real time property is required for the recording and reproduction of the audio and/or video data. Accordingly, data (recording region data) which is necessary for management of the recording regions of the recording medium is stored in the memory of the computer for controlling the recording apparatus so that high speed writing and reading of the data is possible and is used for the control of the recording apparatus.

However, for example, when the power supply stops and the recording region data stored in the memory of the control computer is lost, it becomes impossible to reproduce the audio and/or video data from the recording medium. In order to prevent such a situation, it is necessary to adequately back-up the contents of the memory of the control-use computer.

On the other hand, the memory of the control computer is frequently accessed during a period where the video server is operating. Therefore when the storage content is simply backed up regardless of the existence of the writing access, noncoincidence is caused between the contents of the backed up recording region data and the contents of the recording region data stored in the memory. Accordingly, it is necessary to back-up all of the recording region data stored in the memory at a certain point of time so as to maintain coherence of these data.

SUMMARY OF THE INVENTION

An object of the present invention is to provide a memory back-up apparatus and a method thereof with which the data stored in a memory of a computer can be adequately backed up and by which, even if an abnormality such as a stoppage of a power source occurs, significant data is not lost.

Another object of the present invention is to provide a memory back-up apparatus and a method thereof by which noncoincidence is not caused between the backed up data and the data stored in the memory and the coherence of these data can be held.

Still another object of the present invention is to provide an audio and/or video data recording and reproducing apparatus in which a memory back-up apparatus and a method thereof are supplied so that the data indicating recording regions of the audio and/or video data recorded on a recording medium can be backed up by an adequate method and, in addition, which maintain the coherence of the backed up data and the data stored in the memory so that the audio and/or video data can be recorded and reproduced with a high reliability.

To achieve the above objects, the memory back-up apparatus according to the present invention is a memory back-up apparatus for the back-up of data to be stored by a memory of a computer with a predetermined frequency, having a RAM for buffering all or part of the data to be stored in the memory at one point of time; a battery back-up use battery for performing the battery back-up of the RAM; and a nonvolatile memory for storing the buffered data whenever the RAM buffers the data.

1. Preferably, the RAM does operate the buffering of the data of the memory over again from the first where a write access with respect to the data to be buffered occurs in the middle of the buffering of the data of the memory; and the nonvolatile memory stores the buffered data whenever the RAM completes the buffering of the data.

Preferably, it further has a battery consumption detecting means for detecting whether or not the power stored in the battery back-up use battery is consumed; and a storage control means for storing the data to be stored by the nonvolatile memory at an original address of the memory of the computer where the consumption of power of the battery back-up use battery is not detected at the startup of the computer.

Also, the memory back-up method according to the present invention comprises the steps of buffering all or part of the data stored by the memory of the computer at a certain point of time in a RAM subjected to the battery back-up by using a battery with a predetermined frequency so as to hold the coherence of this data and storing the data buffered in the nonvolatile memory whenever the RAM completes the buffering of the data.

Preferably, in order to hold the coherence of the buffered data, where write access with respect to the data to be buffered occurs in the middle of the buffering of the data of the memory, the buffering is tried again from the first.

Preferably, it is detected whether or not the power of the battery for the battery back-up is consumed at the startup of the computer; and where the consumption of the battery is not detected, the data to be stored by the nonvolatile memory is stored at the original address of the memory of the computer.

Further, an audio and/or video data recording and reproducing apparatus according to the present invention has a memory back-up apparatus according to the present invention.

An audio and/or video data recording and reproducing apparatus according to the present invention records audio data and video data or either of them (audio and/or video data) on a randomly accessible recording medium capable such as a hard disc (HD) or a magneto-optical disc (OM) and can provide any part of the recorded audio and/or video data to an editing apparatus etc.

In the audio and/or video data recording and reproducing apparatus according to the present invention, the recording and reproducing apparatus records and reproduces the audio and/or video data with respect to the randomly accessible recording medium.

The recording region data, which indicates in which recording regions of the recording medium the recording and reproducing apparatus records each of a plurality of sets of audio and/or video data and which is indispensable for the reproduction of the audio and/or video data, is stored in a volatile semiconductor memory etc. capable high speed writing and reading. The recording and reproduction control device controls the recording and reproduction operation of the recording apparatus based on the recording region data stored in this memory.

The memory back-up apparatus in the audio and/or video data recording and reproducing apparatus according to the present invention suitably performs the back-up of the recording region data stored in the memory of the recording and reproduction control device while holding the coherence of the recording region data of the memory and the recording region data after the back-up.

In the memory back-up apparatus, the RAM buffers the recording region data to be stored by the memory at a point of time for performing the back-up. That is, the RAM buffers all of the recording region data stored in the memory of the recording and reproduction control means at a high speed during a period where the CPU etc. of the recording and reproduction control device does not perform the write access with respect to the recording region data, brings the recording region data of the memory and the buffered recording region data into coincidence, and guarantees the coherence of these data. Note, where the recording region data is write-accessed before completion of the buffering of all recording region data by the RAM, the coherence of the data can no longer be held, and therefore the RAM does the back-up of the recording region data over again from the first.

The battery for the battery back-up performs the battery back-up of the RAM so that the contents of the RAM are not lost even in a case where the supply of the electric power with respect to the audio and/or video data recording and reproducing apparatus stops.

The nonvolatile memory stores the data buffered by the RAM in a memory element having nonvolatility, for example flash memory, although a relatively long time is taken for the writing of the data and performs the back-up whenever the RAM completes the buffering of the data.

Further, the battery consumption detecting means detects whether or not the recording region data buffered in the RAM is valid according to whether or not the battery back-up use battery is consumed.

The storage control means copies the data stored by the RAM to the original address of the memory of the recording and reproduction control means when the consumption of the battery back-up use battery is not detected when for example the supply of the electric power of the audio and/or video data recording and reproducing apparatus is restarted and the recording region data buffered in the RAM is valid and provides this for the control of the recording and reproduction operation.

On the other hand, the storage control means copies the recording region data backed up in the nonvolatile memory to the memory of the recording and reproduction control means where the consumption of the battery back-up use battery is detected when the supply of the electric power is restarted and the recording region data buffered in the RAM is invalid and provides this for the control of the recording and reproduction operation.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

First Embodiment

Below, a first embodiment of the present invention will be explained.

Figure 1A:
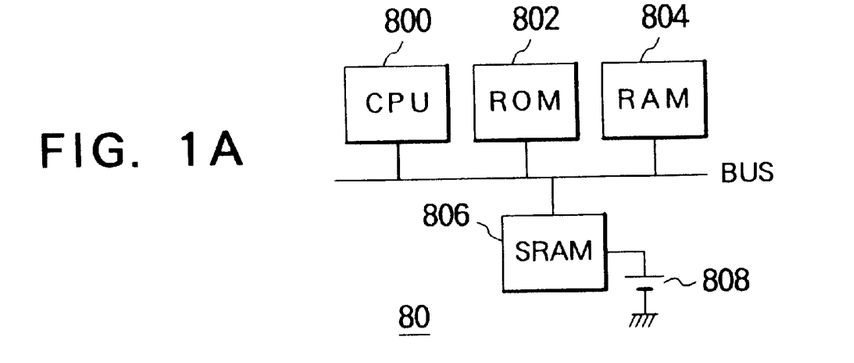
FIG. 1A to FIG. 1C are views of the configuration of a first embodiment of the present invention.
Figure 1B:
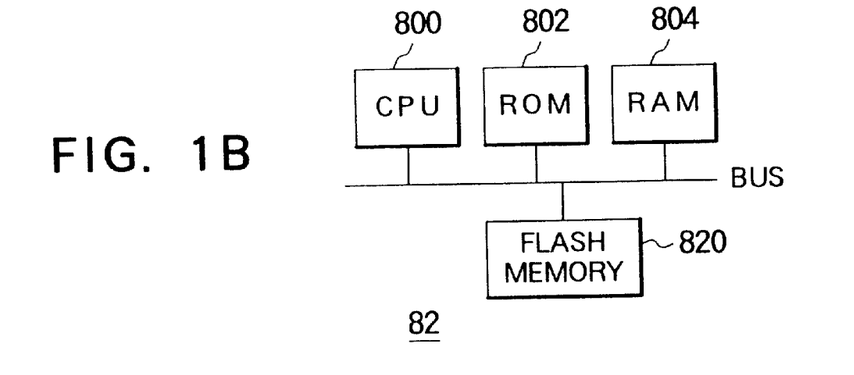
Figure 1C:
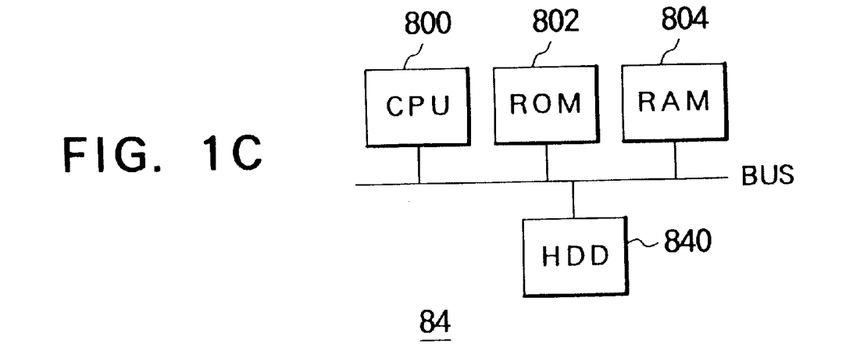

FIG. 1A to FIG. 1C are views showing the configuration of computers 80, 82, and 84 in the first embodiment.

As shown in FIG. 1A, the computer 80 is constituted by a microprocessor (CPU) 800, a ROM 802, a RAM 804, an SRAM 806, and a battery back-up use battery 808.

The microprocessor 800 executes the programs stored in the ROM 802 and performs the control of the recording and reproduction operation with respect to for example a hard disc device (HDD, not illustrated).

The RAM 804 is constituted by a high speed volatile memory device, for example, a dynamic RAM (DRAM) and stores the data necessary for the processing of the programs to be executed by the microprocessor 800, for example, the recording region data for managing the recording regions of the hard disc device.

The SRAM 806 is constituted by the high speed volatile memory device, for example, a static RAM (SRAM), and is given battery back-up by the battery back-up use battery 808 so that the stored data is not lost even if the supply of the electric power to the computer 80 stops, and copies the stored contents of the RAM 804 at a predetermined cycle to perform back-up.

Below, the operation of the computer 80 will be explained.

The microprocessor 800 executes the programs stored in the ROM 802 by using the RAM 804.

The SRAM 806 periodically copies all of the data stored in the RAM 804 or particularly significant data such as the recording region data.

For example, where restart is performed after the supply of the electric power to the computer 80 stops, the microprocessor 800 executes the reactivation program at the restoration of the supply of the electric power, copies the data backed up in the SRAM 806 to the RAM 804, and executes the processings continuing from the stop of the supply of the electric power.

Note that, as shown in FIG. 1B, it is also possible to perform the back-up of the data stored in the RAM 804 by replacing the computer 80 shown in FIG. 1A with a computer 82 having a structure in which the SRAM 806 and the battery back-up use battery 808 are replaced by the nonvolatile flash memory 820.

Further, as shown in FIG. 1C, it is also possible to perform the back-up of the data stored in the RAM 804 by replacing the computer 80 by a computer 84 having a structure in which the SRAM 806 and the battery back-up use battery 808 are replaced by the hard disc device 840.

Second Embodiment

Below, a second embodiment of the present invention will be explained.

In the first embodiment, when the data stored in the RAM 804 is to be copied to the SRAM 806 and backed up as in the computer 80 shown in FIG. 1A, the backed up data is lost if the battery back-up use battery 808 is consumed or trouble such as short circuiting occurs in the SRAM 806.

Further, according to the method of copying the data stored in the RAM 804 to the flash memory 820 and performing the back-up as in the computer 82 shown in FIG. 1B, the battery back-up use battery 808 can be omitted.

However, according to this method, the speed when writing the data in the flash memory 820 at the time of back-up is slow, a long time is required for the back-up processing, and in addition the data written heretofore must be erased preceding the writing of the data.

Further, according to the method of copying the data stored in the RAM 804 to the hard disc device 840 and performing the back-up as in the computer 84 shown in FIG. 1C, if the hard disc device 840 is constituted by a single hard disc device, the MTBF generally becomes short and a sufficient reliability can not be obtained.

On the other hand, where the hard disc device 840 is given a RAID structure constituted by a plurality of hard disc devices, the reliability of the computer 84 becomes high. However, a problem still remains that the shock resistance of the hard disc device is low, and in addition the size of the apparatus becomes too big so when trying to back up the a few megabytes or so of data like the recording region data.

A video server 1 according to the second embodiment of the present invention was made in consideration with such a problem and is constituted so as to be able to quickly supply any part of the audio and/or video data to the editing apparatus etc. and in addition indicate in which recording regions of the hard disc array device the audio and/or video data is recorded even in a case where an obstacle such as a stoppage of the supply of the electric power occurs and adequately and reliably perform the back-up of the recording region data significant for the control of the recording and reproduction operation of the audio and/or video data.

Figure 2:
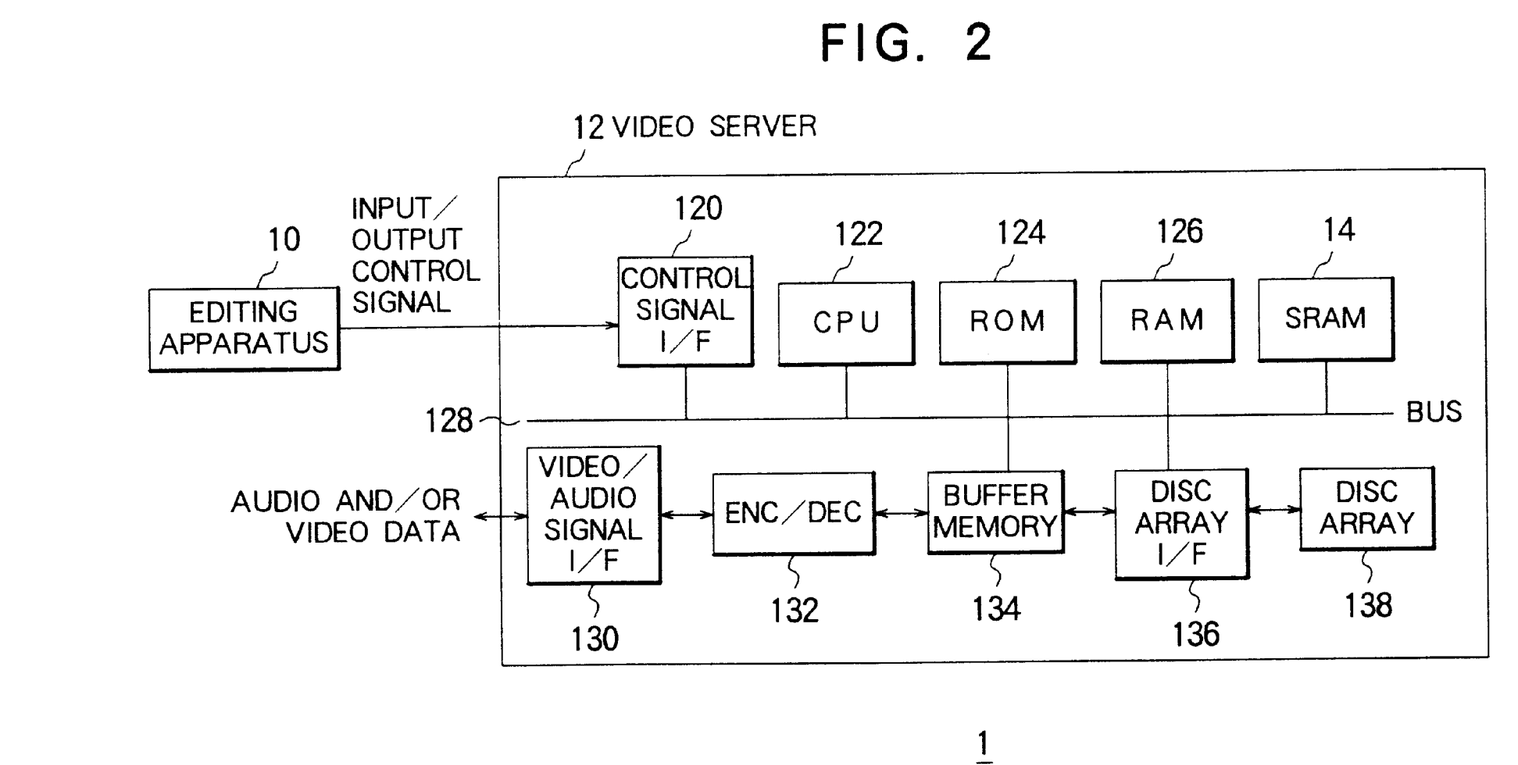
FIG. 2 is a view of the configuration a video server according to a second embodiment of the present invention.

FIG. 2 is a view of the configuration of the video server 1 according to the second embodiment of the present invention.

As shown in FIG. 2, the video server apparatus 1 is constituted by an editing apparatus 10, a recording and reproducing apparatus 12, a control signal interface circuit (control signal I/F) 120, a microprocessor (CPU) 122, a ROM 124, a RAM 126, a video audio signal interface circuit (video audio signal I/F) 130, a compression and expansion apparatus 132, a buffer memory 134, a disc array interface circuit (disc array I/F) 136, a disc array device 138, and a memory back-up apparatus 14 all connected via an external bus 128.

Figure 3:
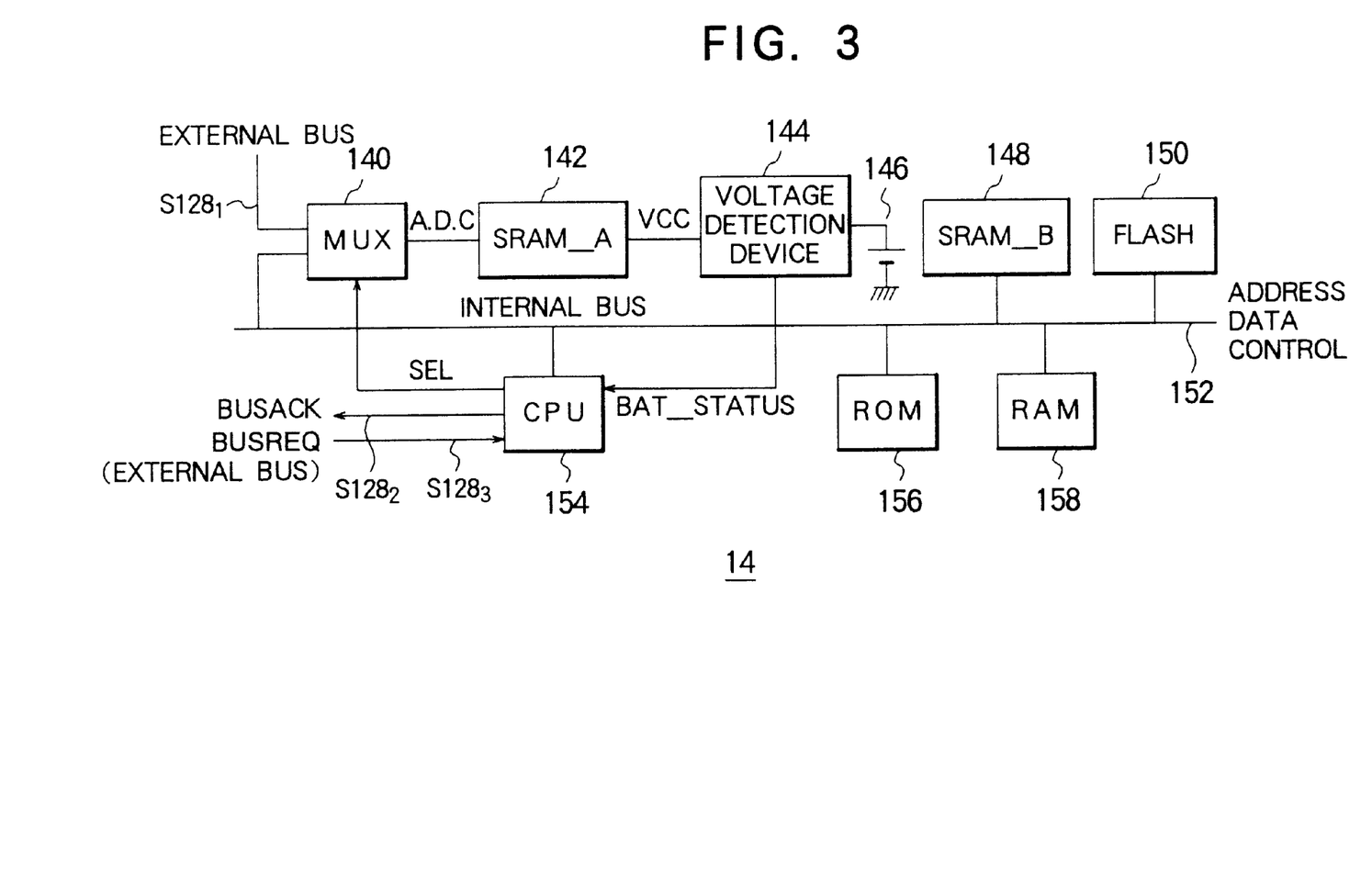
FIG. 3 is a view of the configuration of a memory back-up apparatus shown in FIG. 2.

FIG. 3 is a view of the configuration of the memory back-up apparatus 14 shown in FIG. 2.

As shown in FIG. 3, the memory back-up apparatus 14 is constituted by a multiplexing circuit (MUX) 140, a first SRAM (SRAM A) 142, a voltage detection device 144, a battery back-up use battery 146, a second SRAM 148, a nonvolatile memory (FLASH) 150, an internal microprocessor (CPU) 154, an internal ROM 156, and an internal RAM 158 all connected via an internal bus 152.

Below, constituent parts of the video server apparatus 1 will be explained.

The editing apparatus 10 controls the recording and reproducing apparatus 12 via an input/output control signal, receives the supply of any part of the audio and/or video data from the recording and reproducing apparatus 12, performs the editing, outputs the audio and/or video data after the editing to the recording and reproducing apparatus 12, and makes this record the audio and/or video data.

In the recording and reproducing apparatus 12, the control signal I/F 120 receives the input/output control signal from the editing apparatus 10 and outputs this to the external microprocessor 122 via the external bus 128. Further, the control signal I/F 120 receives the input/output control signal from the external microprocessor 122 and outputs this to the editing apparatus 10.

The external microprocessor 122 executes the programs stored in the ROM 124 and performs the control of the recording and reproduction operation of the disc array device 138, operation control of other constituent parts of the recording and reproducing apparatus 12, and the back-up processing of the data stored in the RAM 126 by using the RAM 126.

The RAM 126 is constituted by a high speed volatile memory device such as a dynamic RAM (DRAM) and stores the data to be used by the external microprocessor 122 for the processing, for example, the recording region data indicating in which recording regions of the disc array device 138 the disc array device 138 records each of a plurality of sets of audio and/or video data.

The video audio signal I/F 130 receives the audio and/or video data input from the compression and expansion apparatus 132 and outputs this to the editing apparatus 10. Further, the video audio signal I/F 130 receives the audio and/or video data input from an external video processing apparatus such as the editing apparatus 10 or VTR apparatus and outputs this to the compression and expansion apparatus 132.

The compression and expansion apparatus 132 compresses and codes the noncompressed audio and/or video data input from the video audio signal I/F 130 by for example the MPEG system and outputs the same to the disc array I/F 136 via the buffer memory 134. Further, the compression and expansion apparatus 132 expands and decodes the compressed audio and/or video data input from the disc array I/F 136 via the buffer memory 134 by the MPEG system and outputs the same to the video audio signal I/F 130.

The disc array I/F 136 performs the recording and reproduction of the audio and/or video data with respect to the disc array device 138 under the control of the external microprocessor 122 based on the recording region data stored in the ROM 124 and the input/output control signal input from the editing apparatus 10.

The disc array device 138 is constituted by a large number of hard disc devices connected in parallel, has a very large recording capacity, for example, several tens of gigabytes to several hundreds of gigabytes, records the audio and/or video data input from the disc array I/F 136 under the control of the disc array I/F 136, reproduces the recorded audio and/or video data and outputs the same to the disc array I/F 136.

The memory back-up apparatus 14 performs the processing for storing all of the data stored in the RAM 126 or part such as the recording region data, performing the back-up, and copying the stored data to the RAM 126 (restart processing) when the recording and reproducing apparatus 12 is restarted after for example the supply of the electric power to the recording and reproducing apparatus 12 stops.

In the memory back-up apparatus 14, the internal microprocessor 154 (FIG. 3) has a timer function and uses the internal RAM 158, the internal microprocessor 154 executes the programs stored in the internal ROM 156 and performs the operational control of the constituent parts of the memory back-up apparatus 14, the back-up processing with respect to the RAM 126 based on a bus request signal S128₁ (BUSREQ) supplied from the external microprocessor 122 via the external bus 128, the restart processing based on a battery status signal (BAT STATUS) input from the voltage detection device 144, and the generation of a bus acknowledge signal S128₂ (BUSACK).

The SRAM 142 is constituted by a memory device, for example, a high speed static RAM, and stores the data input from the RAM 126 via the external bus 128 and the multiplexing circuit 140 at the back-up processing.

Further, the SRAM 142 outputs the stored data to the RAM 126 via the multiplexing circuit 140 and the external bus 128 where the restart processing for copying the stored data to the RAM 126 is carried out.

The multiplexing circuit 140 outputs the data S128₁ supplied from the RAM 126 via the external bus 128 to the SRAM 142 under the control of the internal microprocessor 154 at the back-up processing or outputs the data output by the SRAM 142 to the SRAM 148 via the internal bus 152.

Further, where copying the data stored in the SRAM 142 or the nonvolatile memory 150 to the RAM 126, and performing the restart processing, the multiplexing circuit 140 outputs the data S128₁ output by the SRAM 142 to the RAM 126 via the external bus 128 under the control of the internal microprocessor 154 or outputs the data S128₁ output by the nonvolatile memory 150 via the internal bus 152 to the RAM 126 via the external bus 128.

The voltage detection device 144 performs the battery back-up with respect to the SRAM 142 by using electric power (VCC) supplied by the battery 146 so that the data stored in the SRAM 142 is not lost even in a case where the supply of the electric power to the video server 1 stops. Further, the voltage detection device 144 detects whether or not the electric power for the battery back-up with respect to the SRAM 142 can not be supplied by the battery 146 (consumed) and outputs the result of detection to the internal microprocessor 154 as the battery status signal.

The SRAM 148 is constituted by a high speed SRAM etc. similar to the SRAM 142, buffers the data input from the SRAM 142 via the multiplexing circuit 140 and the internal bus 152, and supplies the same to the nonvolatile memory 150. Further, the SRAM 148 buffers the data input from the nonvolatile memory 150 and outputs the same to the RAM 126 via the internal bus 152, the multiplexing circuit 140, and the external bus 128.

Note that, the SRAM 148 is inserted since the writing speed of the flash memory used in the nonvolatile memory 150 is slow and plays a role of buffering the data transferred from the SRAM 142 at a high speed and reducing the period for which the SRAM 142 can not store the data supplied from an external unit to the lowest limit.

The nonvolatile memory 150 is constituted by for example a nonvolatile flash memory element in which the data is erased by complete erasure and in which the data is sequentially stored and stores the data input from the SRAM 142 via the multiplexing circuit 140 and the internal bus 152 at the back-up processing.

Further, the nonvolatile memory 150 outputs the stored data to the RAM 126 via the internal bus 152, the multiplexing circuit 140, and the external bus 128 at the restart processing.

Below, an explanation will be made of the operation of the video server 1 when performing the back-up processing of the data stored in the RAM 126 and the restart processing by referring to FIG. 4 to FIG. 6.

First, an explanation will be made of the operation when performing the back-up of the recording region data stored in the RAM 126 (FIG. 2) to the SRAM 142 by referring to FIG. 4 and FIG. 5.

Figure 4:
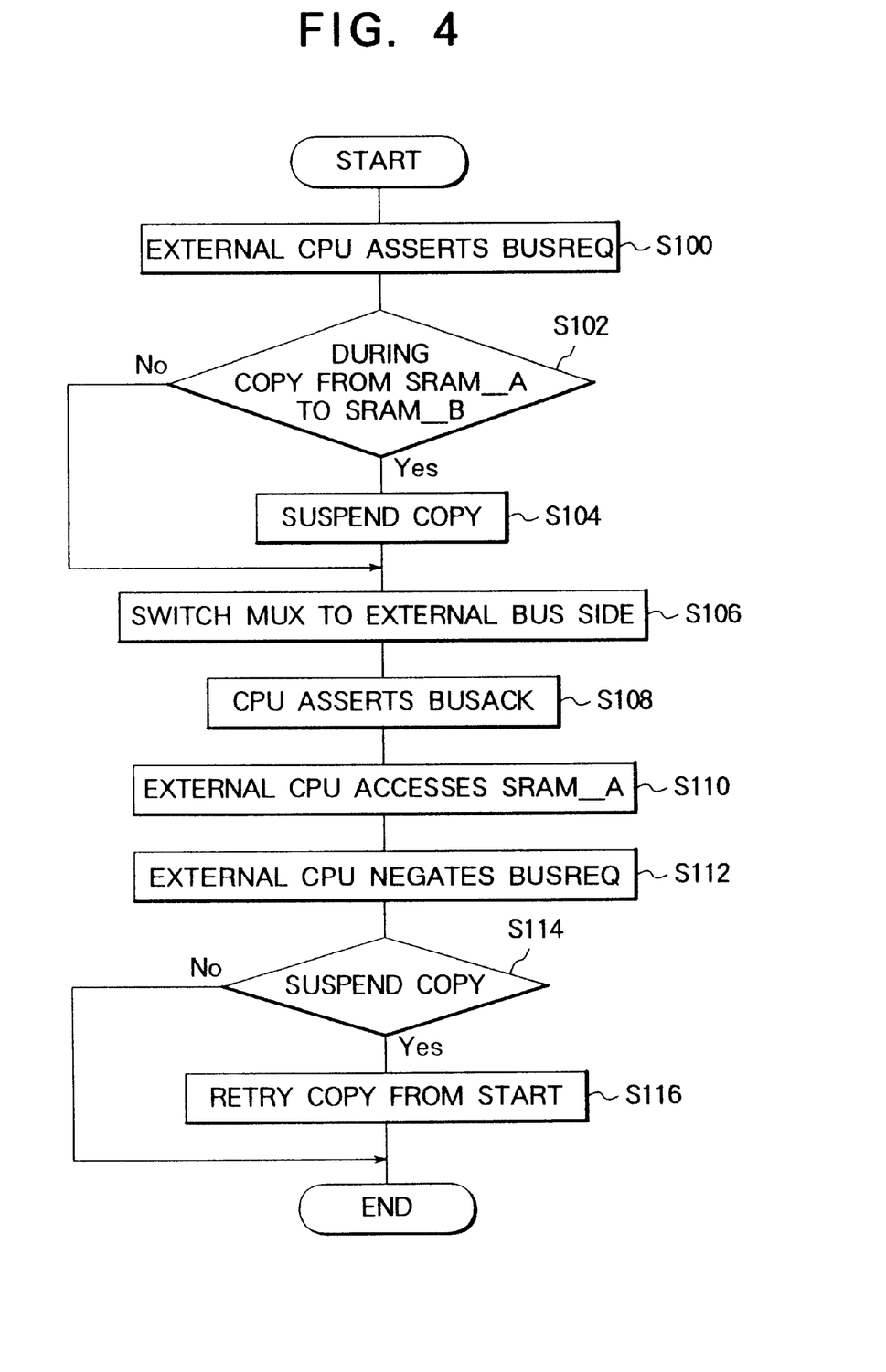
FIG. 4 is a flowchart showing an operation of the video server when performing the back-up of recording region data stored to a RAM (FIG. 1) in a SRAM.

FIG. 4 is a flowchart showing the operation of the video server 1 when performing the back-up of the recording region data stored in the RAM 126 (FIG. 1) to the SRAM 142.

As shown in FIG. 4, the external microprocessor 122 activated (asserts) the bus request signal S128₃ with a predetermined frequency, for example at every predetermined cycle (a few minutes to several tens minutes) or whenever several number of times of write access occurs, and outputs the same to the internal microprocessor 154 (S100).

The internal microprocessor 154 decides whether or not the data is being copied from the SRAM 142 to the SRAM 148 when the bus request signal S128₃ is activated, proceeds to the processing of S106 where it is now being copied, and proceeds to the processing of S104 where it is not being copied (S102).

The internal microprocessor 154 suspends the copying of the data from the SRAM 142 to the SRAM 148 (S104).

The internal microprocessor 154 controls the multiplexing circuit 140, and connects the external bus 128 and the SRAM 142 (S106).

The internal microprocessor 154 activates (asserts) the bus acknowledge signal S128₂ and outputs the same to the external microprocessor 122 (S108).

The external microprocessor 122 read the data to be backed up such as the recording region data from the RAM 126, accesses the SRAM 142 via the external bus 128 and the multiplexing circuit 140, writes the data, and performs the back-up (S110).

The external microprocessor 122 inactivates (negates) the bus request signal S128₃ where all of the data to be backed up is written into the SRAM 142 (at the completion of back-up) and where the write access with respect to the data to be backed up is carried out and outputs the same to the internal microprocessor 154 (S112).

The external microprocessor 122 decides whether or not the back-up of the data stored in the RAM 126 is completed, terminates the processing where it is completed, and proceeds to the processing of S116 where it is not completed (S114).

The external microprocessor 122 performs the back-up of the data stored in the RAM 126 from the first (processing of S100) (S116).

Figure 5:
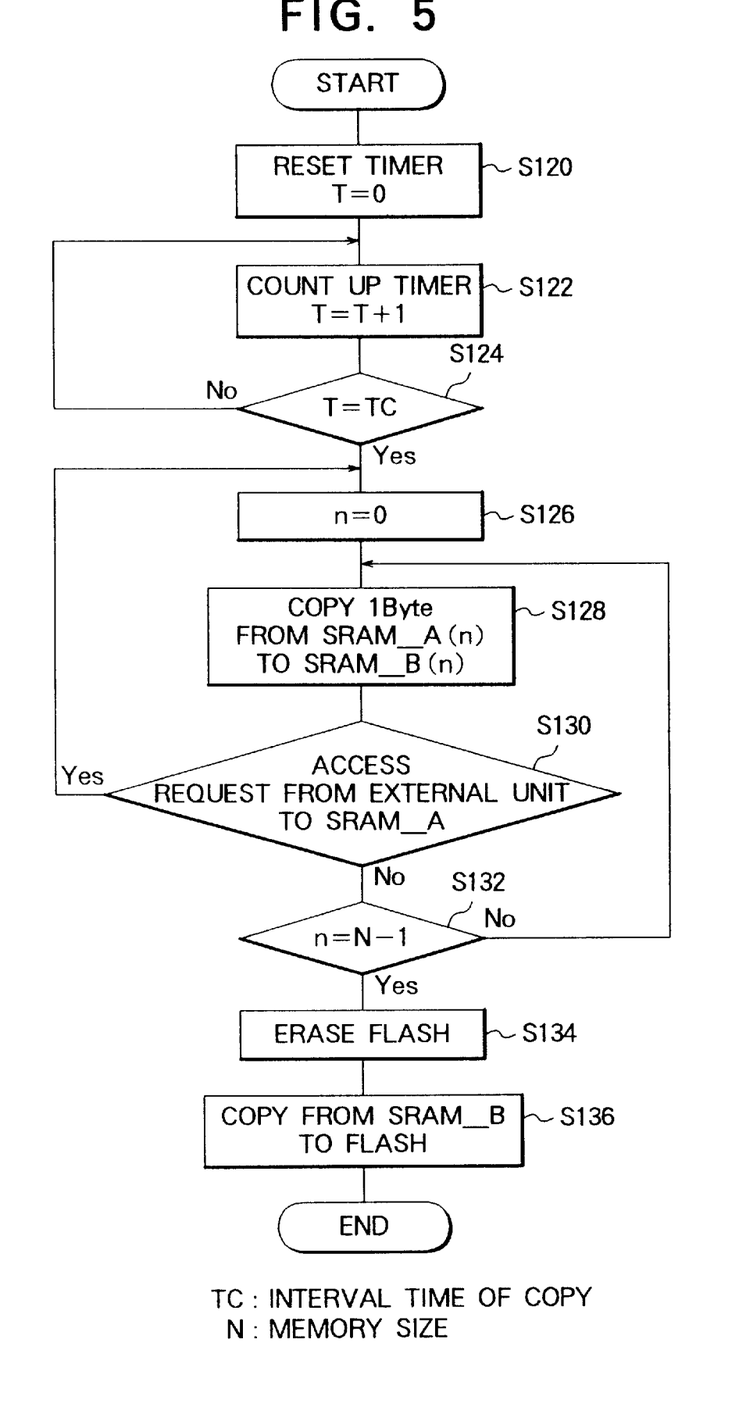
FIG. 5 is a flowchart showing the operation of the video server which copies the data backed up in the SRAM (142, FIG. 3) to the memory via the SRAM (148)

FIG. 5 is a flowchart showing the operation of the video server 1 for copying the data backed up to the SRAM 142 (FIG. 3) to the nonvolatile memory 150 via the SRAM 148.

The internal microprocessor 154 resets the count value T of the timer when the copying of the data from the SRAM 142 to the nonvolatile memory 150 is terminated and brings the value to zero (S120).

The internal microprocessor 154 increments the count value T of the timer at a predetermined cycle (S122).

The internal microprocessor 154 decides whether or not the count value T of the timer is equal to the count value TC indicating the interval time when copying the data from the SRAM 142 to the nonvolatile memory 150 (T=TC), proceeds to the processing of S126 where T=TC, and proceeds to the processing of S122 where they are not equal (S124).

The internal microprocessor 154 resets the count value n to be used for the copying of the data from the SRAM 142 to the nonvolatile memory 150 and brings the value to zero (S126).

The internal microprocessor 154 controls the multiplexing circuit 140, supplies the data output by the SRAM 142 to the SRAM 148 via the internal bus 152, and copies one byte of data from the address SRAM_A (n) of the SRAM 142 to the address SRAM_A (n) of the SRAM 148 (S128).

The internal microprocessor 154 decides whether or not access with respect to the SRAM 142 is requested from the external microprocessor 122, that is, whether or not the bus request signal S128$_3$ has been activated, and proceeds to the processing of S126 where the access has been requested, while proceeds to the processing of S132 where it has not been requested (S130).

The internal microprocessor 154 decides whether or not all data are copied from the SRAM 142 to the SRAM 148 based on the byte number N (memory size) of the data to be backed up, proceeds to the processing of S134 where all data has been copied (n=N−1), and proceeds to the processing of S128 where it is not copied (S132).

The internal microprocessor 154 erases the stored contents of the nonvolatile memory 150 (S134).

The internal microprocessor 154 stores the data copied from the SRAM 142 to the SRAM 148 in the nonvolatile memory 150 (S136).

Below, an explanation will be made of the restart operation where the restart is carried out after the video server 1 crashes.

Figure 6:
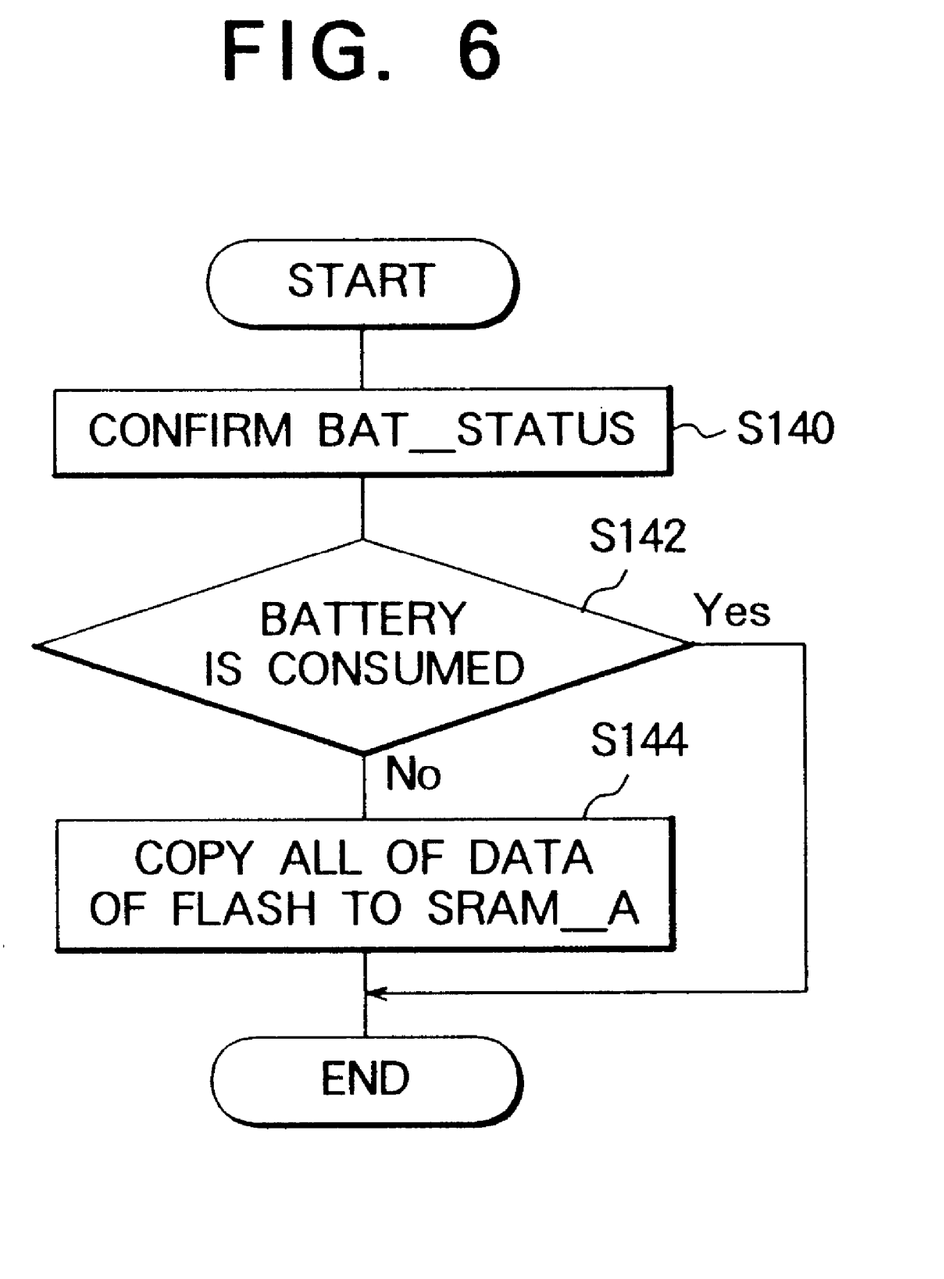
FIG. 6 is a flowchart showing the operation of restart of the video server (FIG. 2)

FIG. 6 is a flowchart showing the operation of the restart of the video server 1 (FIG. 2).

For example, when the restart processing starts accompanied with the restart of the supply of the electric power to the video server apparatus 1, the internal microprocessor 154 (FIG. 3) inspects the power supply status signal of the voltage detection device 144 (S140).

As a result of inspection, where the consumption of the battery 146 is not detected, the internal microprocessor 154 and the external microprocessor 122 (FIG. 2) control the multiplexing circuit 140, supply the data backed up to the SRAM 142 to the RAM 126, copy the data to the original address, and terminate the processing, while when the consumption is detected, proceed to the processing of S144 (S142).

The internal microprocessor 154 and the external microprocessor 122 control the multiplexing circuit 140, supply the data stored in the nonvolatile memory 150 to the SRAM 142, and copy this. Further, the internal microprocessor 154 and the external microprocessor 122 control the multiplexing circuit 140, supply the data copied to the SRAM 142 to the RAM 126, copy the same to the original address, and terminate the processing (S144).

As explained above, by the processing of the signals S114 and S116 (FIG. 4) in the back-up processing explained in the second embodiment, where a write access occurs in the data stored in the RAM 126 to be backed up, and the noncoincidence of the data stored in the SRAM 142 and the data stored in the RAM 126 occurs, the back-up processing will be tried again from the first, and the data stored in the RAM 126 at a certain point of time can be backed up to the SRAM 142 as it is. Accordingly, by the processing of S114 and S116, the noncoincidence of the data is prevented, and the coherence is guaranteed.

Further, by once copying the data from the SRAM 142 to the SRAM 148 when copying the data from the SRAM 142 to the nonvolatile memory 150 explained in the second embodiment, and then storing this again in the nonvolatile memory 150, the storage of the data to the nonvolatile memory 150 is completed at one time. Accordingly, no noncoincidence occurs between the data stored in the SRAM 148 and the data to be stored in the nonvolatile memory 150. Further, the write enable time of the flash memory used in the nonvolatile memory 150 is finite, therefore early deterioration of the nonvolatile memory 150 can be prevented.

Further, where the battery 146 is not consumed by the restart processing explained in the second embodiment, the video server 1 can be restarted by using the data last backed up in the SRAM 142. Even if the battery 146 is consumed and the data of the SRAM 142 has been lost, the video server 1 can be restarted by using the data stored in the nonvolatile memory 150.

Further, the memory back-up apparatus 14 is the same as only high speed memory apparatus when seen from the external bus 128 side, so can be quite equivalently treated.

Further, since the data is backed up in the backed up SRAM 142 and the nonvolatile memory 150 in a duplex manner, the reliability is very high.

Figure 7:
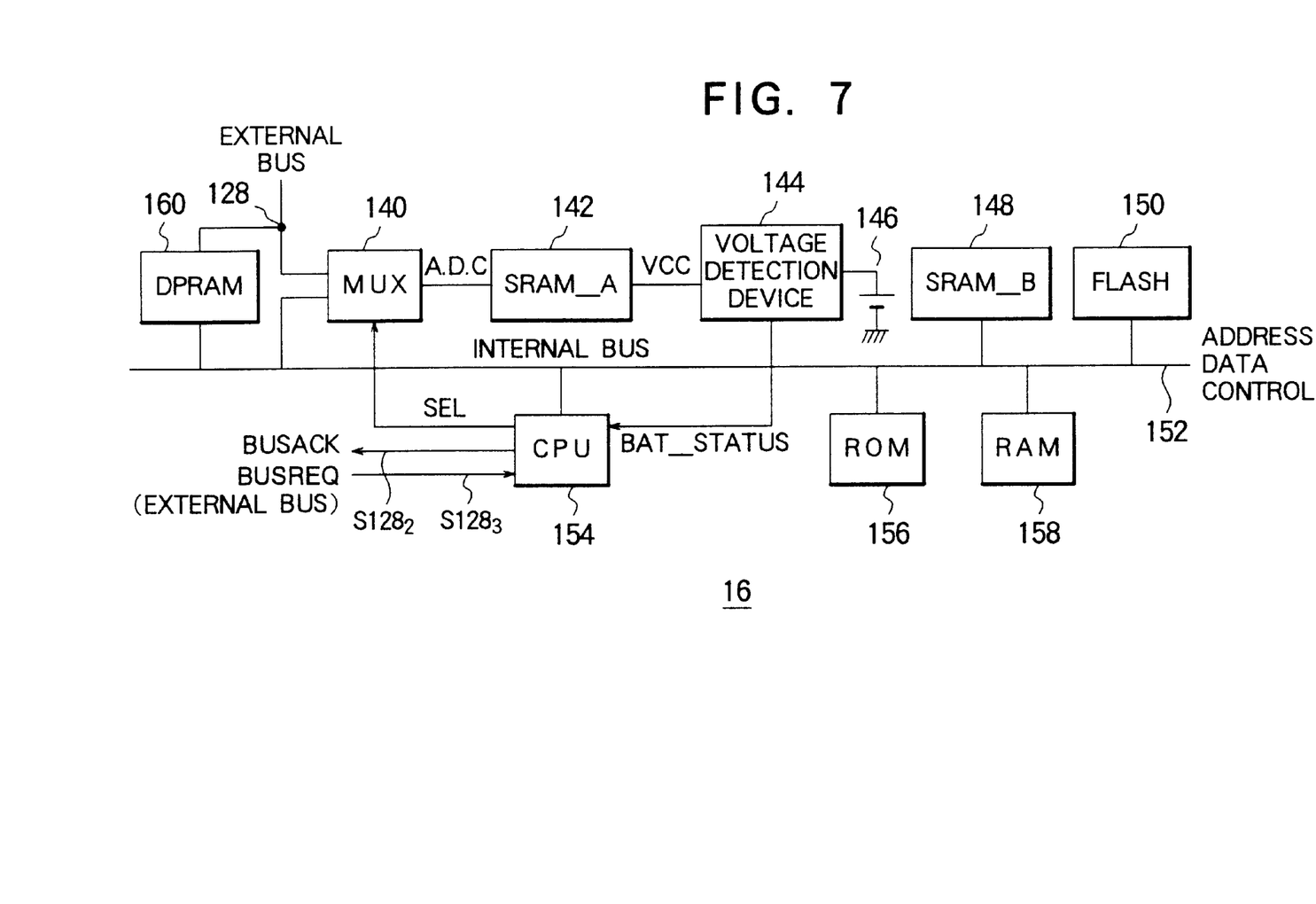
FIG. 7 is a view showing a modification of the memory back-up apparatus (FIG. 2, FIG. 3).

FIG. 7 is a view showing a modification of the memory back-up apparatus 14 (FIG. 2, FIG. 3).

Note that, as shown in FIG. 7, the video server 1 can be constituted by using a memory back-up apparatus 16 comprised of a dual port RAM (DPRAM) 160 added to the memory back-up apparatus 14. The external microprocessor 122 can send a command to the internal microprocessor 154 via the dual port RAM 160 in place of the memory back-up apparatus 14.

In the video server apparatus 1 using the memory back-up apparatus 14, the internal microprocessor 154 of the memory back-up apparatus 14 start the copying of the data from the SRAM 142 to the nonvolatile memory 150 by the timer, but when the memory back-up apparatus 16 is used, the external microprocessor 122 controls the internal microprocessor 154 and can make the same perform the copying of the data from the SRAM 142 to the nonvolatile memory 150 at any timing.

As the command from the external microprocessor 122 to the internal microprocessor 154, other than this, there can be considered, for example a command for directly copying the data of the SRAM 142 to the nonvolatile memory 150, a command for copying the data of the nonvolatile memory 150 to the SRAM 142 and a command of confirming the degree of consumption of the battery 146.

Further, obviously, memory back-up apparatus 14 can be used in an apparatus other than the video server 1, for example a memory back-up of a computer system.

Further, where the writing time to the nonvolatile memory 150 is equivalent to the SRAM 142, it is also possible to constitute the memory back-up apparatus by omitting the SRAM 148 and directly copy the data from the SRAM 142 to the nonvolatile memory 150.

Further, it does not matter if the constituent parts of the video server apparatus 1 are realized in terms of software or realized in terms of hardware so far as the same function and performances can be held.

According to the above memory back-up apparatus and the method of same, the data stored in the memory of the computer can be adequately backed up, and for example, even if an abnormality such as a stoppage of the power supply occurs, significant data is not lost.

Further, according to the above memory back-up apparatus and the method of same, no noncoincidence occurs between the backed up data and the data stored in the memory and therefore the coherence of these data is held.

Further, according to the above audio and/or video data recording and reproducing apparatus, the memory back-up apparatus according to the present invention mentioned above and the method of same are applied, therefore the data indicating the recording regions of the audio and/or video data recorded on the recording medium can be backed up by an adequate method and in addition by holding the coherence of the backed up data and the data stored in the memory and the audio and/or video data can be recorded and reproduced with a high reliability.

What is claimed is:

1. A memory back-up apparatus for the back-up of the data to be stored by a memory of a computer with a predetermined frequency, comprising:

a RAM for buffering all or part of the data to be stored in said memory at one point of time;

a battery back-up use battery for performing the battery back-up of said RAM; and a nonvolatile memory for storing the buffered data whenever said RAM buffers the data.

2. A memory back-up apparatus according to claim 1, wherein:

said RAM does the buffering of the data of said memory over again from the first where a write access with respect to the data to be buffered occurs in the middle of the buffering of the data of said memory; and said nonvolatile memory stores the buffered data whenever said RAM completes the buffering of the data.

3. A memory back-up apparatus according to claim 1, further comprising:

a battery consumption detecting means for detecting whether or not said battery back-up use battery is consumed; and a storage control means for storing the data to be stored by said nonvolatile memory at an original address of the memory of said computer where the consumption of said battery back-up use battery is not detected at the startup of said computer.

4. A memory back-up method comprising the steps of buffering all or part of the data stored by the memory of the computer at a certain point of time in a RAM subjected to the battery back-up by using the battery with a predetermined frequency so as to hold the coherence of this data and storing the data buffered in the nonvolatile memory whenever said RAM completes the buffering of the data.

5. A memory back-up method according to claim 4, wherein:

where a write access with respect to the data to be buffered occurs in the middle of the buffering of the data of said memory, the buffering is tried again from the first so as to hold the coherence of the buffered data.

6. A memory back-up method according to claim 4, wherein:

it is detected whether or not the battery for said battery back-up is consumed at the startup of said computer; and where the consumption of said battery is not detected, the data to be stored by said nonvolatile memory is stored at the original address of the memory of said computer.

7. An audio and/or video data recording and reproducing apparatus comprising:

a recording and reproducing apparatus for recording and reproducing audio data and video data or either of them (audio and/or video data) with respect to a predetermined recording medium;

a recording and reproduction control device for storing the recording region data indicating the recording regions of said audio and/or video data in said predetermined recording medium in the memory and controlling the recording and reproduction operation of said recording apparatus based on this recording region data; and a memory back-up apparatus, wherein said memory back-up apparatus is a memory back-up apparatus for performing the back-up of the data to be stored by the memory of said recording and reproduction control apparatus with a predetermined frequency and has:

a RAM for buffering all or part of the data to be stored by said memory at one point of time;

a battery back-up use battery for performing the battery back-up of said RAM; and a nonvolatile memory for storing buffered data whenever said RAM buffers the data.

8. An audio and/or video data recording and reproducing apparatus according to claim 7, wherein:

said RAM does over again the buffering of the data of said memory from the first where a write access with respect to the data to be buffered occurs in the middle of the buffering of the data of said memory and said nonvolatile memory stores the buffered data whenever said RAM completes the buffering of the data.

9. An audio and/or video data recording and reproducing apparatus according to claim 7, wherein said memory back-up apparatus further has:

a battery consumption detecting means for detecting whether or not said battery back-up use battery is consumed and a storage control means for storing the data to be stored by said nonvolatile memory at an original address of the memory of said recording and reproduction control means where the consumption of said battery back-up use battery is not detected at the startup of said recording and reproduction control means.

* * * * *